US008277976B2

(12) United States Patent
Ryu et al.

(10) Patent No.: US 8,277,976 B2
(45) Date of Patent: Oct. 2, 2012

(54) BINDER WITH GOOD RATE PROPERTY AND LONG CYCLEABILITY FOR LITHIUM SECONDARY BATTERY

(75) Inventors: Dong Jo Ryu, Daejeon (KR); Cha Hun Ku, Daejeon (KR); Chang Sun Han, Daejeon (KR); Byoung Yun Kim, Daejeon (KR); Ju Hyun Kim, Daejeon (KR); Chang Wan Koo, Daejeon (KR)

(73) Assignee: LG Chem, Ltd. (KR)

( * ) Notice: Subject to any disclaimer, the term of this patent is extended or adjusted under 35 U.S.C. 154(b) by 1265 days.

(21) Appl. No.: 11/399,718

(22) Filed: Apr. 7, 2006

(65) Prior Publication Data

US 2006/0257739 A1 Nov. 16, 2006

(30) Foreign Application Priority Data

Apr. 7, 2005 (KR) ........................ 10-2005-0028927

(51) Int. Cl.
*H01M 4/62* (2006.01)

(52) U.S. Cl. ........................................ 429/217; 324/427

(58) Field of Classification Search .................. 429/217; 324/427

See application file for complete search history.

(56) References Cited

U.S. PATENT DOCUMENTS

| | | | | |
|---|---|---|---|---|
| 5,595,841 | A * | 1/1997 | Suzuki | 429/217 |
| 5,631,100 | A * | 5/1997 | Yoshino et al. | 429/62 |
| 5,972,056 | A * | 10/1999 | Brikez | 29/623.5 |
| 6,652,773 | B2 * | 11/2003 | Maeda et al. | 252/181.1 |
| 6,656,633 | B2 * | 12/2003 | Yamakawa et al. | 429/217 |
| 6,756,153 | B1 * | 6/2004 | Yamamoto et al. | 429/217 |

FOREIGN PATENT DOCUMENTS

| | | | | |
|---|---|---|---|---|
| JP | 04051459 | | | 2/1992 |
| JP | 11-025989 | | * | 1/1999 |
| JP | 11025989 | A | | 1/1999 |
| JP | 2000-299109 | | * | 10/2000 |
| JP | 2000299109 | A | | 10/2000 |
| JP | 2002-075458 | | * | 3/2002 |
| JP | 2002075458 | A | | 3/2002 |
| JP | 2003-157851 | | * | 5/2003 |
| JP | 2003157851 | A | | 5/2003 |
| WO | 2004079841 | A1 | | 9/2004 |
| WO | WO-2004-079841 | A1 | * | 9/2004 |
| WO | WO-2006-107173 | A1 | * | 10/2006 |

OTHER PUBLICATIONS

International Search Report dated Jul. 6, 2007 for Application No. PCT/KR2006/001250.

* cited by examiner

*Primary Examiner* — Peter D. Mulcahy
*Assistant Examiner* — Henry Hu
(74) *Attorney, Agent, or Firm* — Lerner, David, Littenberg, Krumholz & Mentlik, LLP

(57) ABSTRACT

Disclosed is a binder, which comprises polymer particles obtained by polymerization of: (a) 1~80 parts by weight of a (meth)acrylic acid ester monomer; (b) 1~20 parts by weight of an unsaturated carboxylic acid monomer; and (c) 0.001~40 parts by weight of a vinyl monomer, based on 100 parts by weight of the binder polymer, and which allows electrode active material particles capable of lithium intercalation/deintercalation to be fixed and linked among themselves, and between the particles and a collector. An electrode comprising the binder, and a lithium secondary battery having the electrode are also disclosed. Further, a method for evaluating interrelation between wettability of a binder to an electrolyte and quality of a battery comprising the binder is disclosed. The binder shows excellent adhesion as well as excellent wettability to an electrolyte, and thus can improve rate characteristics and lifespan characteristics of a battery, when used in an electrode for a lithium secondary battery.

11 Claims, No Drawings

BINDER WITH GOOD RATE PROPERTY AND LONG CYCLEABILITY FOR LITHIUM SECONDARY BATTERY

This application claims the benefit of the filing date of Korean Patent Application No. 10-2005-0028927, filed on Jul. 7, 2005 in the Korean Intellectual Property Office, the disclosure of which is incorporated herein in its entirely by reference.

TECHNICAL FIELD

The present invention relates to a binder for a lithium secondary battery, which improves rate characteristics and lifespan characteristics of a battery by way of interrelation between wettability of a binder and quality of a battery. The present invention also relates to an electrode obtained from electrode slurry comprising the binder, and a lithium secondary battery having the electrode.

BACKGROUND ART

Recently, as portable electronic instruments, such as portable computers, portable phones and camcorders, have been steadily developed so that they are downsized and lightened, lithium secondary batteries used as drive sources for the electronic instruments are also required to have high capacity, compact size, light weight and small thickness.

A lithium secondary battery comprises a cathode, an anode, a separator and an electrolyte. Each of the cathode and the anode comprises a collector and an electrode film, wherein the electrode film comprises an electrode active material, a conductive agent, and an electrode binder. The electrolyte infiltrates into the battery.

In general, quality of a lithium secondary battery largely depends on the electrodes, the electrolyte and other materials used for the battery. Among these factors, the content of the active material introduced into the electrode relates to the maximum value of available lithium ions. Hence, as the active material content increases, a battery has higher capacity. If a binder, which is one of the constitutional elements of a battery, shows excellent adhesion so that the amount of the binder needed for the battery can be reduced, it is possible to provide an electrode having an increased content of electrode active material. Therefore, there is a need for a binder having excellent adhesion.

Polyvinylidene fluoride homopolymer (PVDF), which is a commercially available electrode binder, has the advantages of excellent chemical and electrochemical stability. However, PVDF has disadvantages in that it should be used in the form of a binder composition after being dissolved into an organic solvent such as NMP (N-methyl-2-pyrrolidone), thereby causing an environmental problem, and it should be introduced into a battery in a relatively large amount in order to provide sufficient adhesion.

To solve the above problems, an attempt has been made to form a high-efficiency binder composition that uses water as a dispersion medium and is introduced into a battery in a decreased amount (Japanese Laid-Open Patent No. Hei4-51459). However, such binder composition is problematic in that it may cause degradation in the quality of a battery, particularly, rate characteristics and lifespan characteristics of a battery, compared to a battery using PVDF.

DISCLOSURE OF THE INVENTION

Therefore, the present invention has been made in view of the above-mentioned problems. The present inventors have measured wettability and adhesion of a binder, obtained by polymerization of copolymerizable monomers forming the binder with various compositional ratios, to an electrolyte. Then, we have also measured the quality (rate characteristics and lifespan characteristics) of a lithium secondary battery manufactured by using the binder. As a result, we have demonstrate that there is a unique interrelation between the wettability of the binder and the battery quality and have found a binder composition capable of improving the quality of a battery. The present invention is based on this finding.

Therefore, it is an object of the present invention to provide a binder, which uses water as a dispersion medium and thus is environmentally-friendly, shows excellent adhesion even in a small amount and thus imparts high capacity to a battery, and has excellent wettability to an electrolyte and thus can improve rate characteristics and lifespan characteristics of a battery at the same time. It is another object of the present invention to provide an electrode using the same binder and a lithium secondary battery having the same electrode.

According to an aspect of the present invention, there is provided a binder, which comprises polymer particles obtained by polymerization of: (a) 1~80 parts by weight of a (meth)acrylic acid ester monomer; (b) 1~20 parts by weight of an unsaturated carboxylic acid monomer; and (c) 0.001~40 parts by weight of a vinyl monomer, based on 100 parts by weight of the binder polymer, and which allows electrode active material particles capable of lithium intercalation/deintercalation to be fixed and linked among themselves, and between the particles and a collector. There are also provided a method for preparing the binder, an electrode comprising the binder, and a lithium secondary battery having the electrode.

According to another aspect of the present invention, there is provided a method for evaluating interrelation between wettability of a binder to an electrolyte and quality of a battery comprising the binder, which comprises the steps of: (a) measuring a contact angle (θ) between a binder according to the present invention and an electrolyte to be used in a battery; (b) providing a battery having an electrode formed by using electrode slurry that comprises the binder of step (a) and an electrode active material; and (c) calculating a percent ratio of capacity ($C_Y$) of the battery of step (b), measured by a constant-current method (YC), to capacity ($C_X$) of the battery of step (b), measured by a constant-current method (XC), to determine rate characteristics (YC/XC, R) of the battery, wherein each of X and Y represents a decimal or an integer ranging from 0.001 to 100, with the proviso that X is greater than Y.

According to still another aspect of the present invention, there is provided a method for evaluating interrelation between adhesion of a binder to an electrode and quality of a battery comprising the binder, which comprises the steps of: (a) providing an electrode comprising the binder according to the present invention and an electrode active material, and measuring adhesion of the binder in the electrode; and (b) providing a battery having the electrode of step (a), and calculating a percent ratio of capacity ($C_A$) of the battery after a lapse of the $A^{th}$ cycle to initial capacity ($C_1$) of the battery, measured by a constant-current method (XC), to determine lifespan characteristics (L) of the battery, wherein A is an integer between 2 and 500.

Hereinafter, the present invention will be explained in more detail.

1. Binder for Battery

As used herein, the term "contact angle" refers to the angle of an interface generated by a thermodynamic equilibrium state formed when a liquid substance, such as an electrolyte, is in contact with another immiscible substance, such as a binder. Such contact angles are utilized in an interface study, adhesion, coating and polymer technologies, thin film technology, surface treatment, surface energy calculation, surface tension measurement, or the like, as one of the most important analytical means. Particularly, the contact angle is used as a measure indicating the wettability of a solid surface, caused by a surface energy difference due to hydrophilicity or hydrophobicity.

The binder according to the present invention is characterized in that it has a low contact angle (e.g., 40° or less) to a conventional electrolyte currently used in the art, and thus improves rate characteristics of a battery by activating reactions in an electrode, for example, by causing lithium ions to be moved and transferred into the lattice of an electrode active material, due to the excellent wettability of a binder in the electrode to the electrolyte, and also improves lifespan characteristics of a battery due to the excellent adhesion of the binder.

The first monomer (a) forming the binder polymer is a conventional monomer known to one skilled in the art, which can control the quality of a battery. Particularly, a (meth) acrylic acid ester monomer, which can improve the affinity of an electrode to an electrolyte and rate characteristics of a battery, and has excellent adhesion to a collector, may be used as the first monomer.

Non-limiting examples of such (meth)acrylic acid ester monomers include: (1) acrylate monomers (e.g., methyl acrylate, ethyl acrylate, propyl acrylate, isopropyl acrylate, n-butyl acrylate, isobutyl acrylate, n-amyl acrylate, isoamyl acrylate, n-hexyl acrylate, 2-ethylhexyl acrylate, hydroxyethyl acrylate, hydroxypropyl acrylate, lauryl acrylate, etc.); (2) methacrylate monomers (e.g., methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, hydroxyethyl methacrylate, hydroxypropyl methacrylate, lauryl methacrylate, allyl methacrylate, etc.); or mixtures thereof.

Although there is no particular limitation in the content of the (meth)acrylic acid ester monomer, the (meth)acrylic acid ester monomer is preferably used in an amount of 1~80 parts by weight per 100 parts by weight of the binder polymer according to the present invention. When the (meth)acrylic acid ester monomer is used in an amount of less than 1 part by weight, it is not possible to improve the affinity to an electrolyte and adhesion of the binder decreases significantly. On the other hand, when the (meth)acrylic acid ester monomer is used in an amount of greater than 80 parts by weight, it is not possible to prepare the binder itself, due to the poor stability during the preparation.

The second monomer (b) forming the binder polymer according to the present invention is preferably a monomer capable of controlling the adhesion. This is because such monomers can show excellent adhesion even in a small amount, and can impart high capacity to a battery. Particularly, monomers capable of controlling the adhesion shows excellent binding force of each functional group contained in the monomers to a metal used as a collector, and thus can improve the adhesion.

Non-limiting examples of the monomer (b) capable of controlling the adhesion include: (1) unsaturated monocarboxylic acid monomers (e.g., acrylic acid, methacrylic acid, etc.); (2) unsaturated polycarboxylic acids (e.g., itaconic acid, fumaric acid, citraconic acid, metaconic acid, glutaconic acid, crotonic acid, isocrotonic acid, etc.); (3) acrylamide monomers (e.g., acrylamide, n-methylolacrylamide, n-butoxymethylacrylamide, etc.); (4) methacrylamide monomers (e.g., methacrylamide, n-methylolmethacrylamide, n-butoxymethylmethacrylamide, etc.); or mixtures thereof. Among these monomers, unsaturated carboxylic acid monomers are particularly preferred. Although there is no particular limitation in the content of the monomer capable of controlling the adhesion, the monomer is preferably used in an amount of 1~20 parts by weight per 100 parts by weight of the polymer forming the binder according to the present invention. When the monomer (b) is used in an amount of less than 1 part by weight, adhesion of the binder decreases. On the other hand, when the monomer (b) is used in an amount of greater than 20 parts by weight, it is not possible to prepare the binder itself, due to the poor stability during the preparation.

The third monomer (c) forming the binder polymer according to the present invention is a conventional monomer generally known to one skilled in the art, which can control the quality of a battery. Particularly, a vinyl monomer, capable of controlling the adhesion among electrode active material particles and having excellent ion conductivity, may be used. Non-limiting examples of the monomer (c) include styrene, α-methylstyrene, β-methylstyrene, p-t-butylstyrene, acrylonitrile, methacrylonitrile or a mixture thereof. Particularly, acrylonitrile monomer, which contains a triple bond, shows high ion conductivity and can improve electrical properties of a battery.

The vinyl monomer is used preferably in an amount of 0.001~40 parts by weight per 100 parts by weight of the binder polymer according to the present invention, but is not limited thereto. When the vinyl monomer is used in an amount of greater than 40 parts by weight, glass transition temperature of the binder increases, resulting in a significant drop in the adhesion. Also, in this case, the content of the first monomer decreases accordingly, and the quality of a battery may be degraded due to a drop in the affinity to an electrolyte.

The binder according to the present invention may further comprise another monomer currently used in the art. Particularly, a conjugated diene monomer is preferred and non-limiting examples of the conjugated diene monomer include 1,3-butadiene, 1,3-pentadiene, isoprene or a mixture thereof. Additionally, the conjugated diene monomer is used preferably in an amount of 0~70 parts by weight per 100 parts by weight of the total weight of the polymer, but is not limited thereto. When the conjugated diene monomer is used in an amount of greater than 70 parts by weight, it is not possible to prepare the binder itself, due to the poor stability during the preparation.

The binder according to the present invention comprises 2~10 kinds of monomers of the aforementioned monomers, but is not limited thereto.

Preferably, the polymer particles obtained by polymerization of the aforementioned monomer composition have a final particle diameter of 100~300 nm, a glass transition temperature of −30~50° C., and a gel content of 30~90%. If the polymer particles have a particle size, a glass transition temperature and a gel content, which are away from the aforementioned ranges, adhesion of the binder to a collector decreases significantly, resulting in degradation in the quality of a battery. Additionally, the polymer particles have a solubility parameter of 18~30 $MPa^{1/2}$, so that they show improved affinity to an electrolyte injected subsequently into a battery and activate electrochemical reactions in an electrode.

Meanwhile, the aforementioned monomers except the unsaturated carboxylic acid monomer (b), i.e., the (meth) acrylic acid ester monomer (a), the vinyl monomer (c) and the conjugated diene monomer can control the overall quality of a battery, including initial capacity, initial efficiency, capacity variation during repeated charge/discharge cycles or physical properties of a battery.

Each of the monomers capable of controlling the quality of a battery has a specific surface energy. Thus, the polymer formed by using the monomers has a different surface energy depending on the composition of the monomers. The surface energy difference causes a difference in the affinity to an electrolyte, resulting in a difference in a contact angle between the polymer and the electrolyte. Therefore, according to the present invention, it is possible to significantly improve the wettability of the binder by decreasing the contact angle between the binder and an electrolyte to be used to 40° or less through the use of the copolymerzable monomers with the compositional ratio as described above. Additionally, when the binder is used to manufacture an electrode, it is possible to activate electrochemical reactions, caused by the conduction and transfer of lithium ions in the electrode, by increasing the affinity to an electrolyte, improving the permeability of the electrolyte into the electrode, while utilizing the pore volume of the electrode sufficiently, and thus to improve the overall quality, including rate characteristics, of a battery. Particularly, the binder according to the present invention can be used in water as well as NMP conventionally used as a dispersion medium and conventional organic solvents used in a non-aqueous electrolyte. Therefore, it is possible to solve the problem of PVDF, related to the use of an organic solvent, and the binder according to the present invention is environmentally-friendly.

Further, according to the present invention, it is also possible to improve the lifespan characteristics of a battery by using the monomer capable of controlling the adhesion (such as an unsaturated carboxylic acid monomer), controlling its content suitably and by improving the adhesion of the binder to an electrode active material and to a collector to 50 g/cm or more. Additionally, the binder according to the present invention can show more excellent adhesion even in a small amount, compared to PVDF that is introduced in a relatively large amount to show sufficient adhesion.

In addition, when an electrolyte is injected into a battery after the assemblage of the battery, the binder according to the present invention imparts a high infiltration rate to the electrolyte due to its excellent affinity to the electrolyte and shows high lithium ion conductivity, resulting in further improvement in the quality of the battery.

The binder according to the present invention may further comprise conventional additives, such as a molecular weight modifier and a crosslinking agent, in addition to the aforementioned monomers. It is possible to control the gel content of the binder particles by controlling the amount of the molecular weight modifier and that of the crosslinking gent.

The molecular weight modifier that may be used in the present invention includes t-dodecyl mercaptan, n-dodecyl mercaptan, n-octyl mercaptan, or the like. The crosslinking agent that may be used in the present invention includes 1,3-butanediol diacrylate, 1,3-butanediol dimethacrylate, 1,4-butanediol diacrylate, 1,4-butanediol dimethacrylate, aryl acrylate, aryl methacrylate, trimethylolpropane triacrylate, tetraethyleneglycol diacrylate, tetraethyleneglycol dimethacrylate, divinylbenzene, or the like.

As a polymerization initiator, any compound that causes generation of radicals may be used, and particular examples thereof include ammonium persulfate, potassium persulfate, sodium persulfate, benzoyl peroxide, butyl hydroperoxide, cumene hydroperoxide, azobisisobutyronitrile, or a mixture thereof. Among these, a water soluble or redox polymerization initiator is preferred.

The polymer particles according to the present invention may be prepared by a conventional polymerization process known to one skilled in the art, for example, by an emulsion polymerization process, a suspension polymerization process, a dispersion polymerization process, a two-step polymerization process using seed polymerization, or the like. Herein, polymerization temperature and polymerization time may be selected depending on the kind of the polymerization initiator used for the polymerization. For example, polymerization may be carried out at a temperature of about 30~100° C. for 0.5~20 hours.

2. Binder Composition for Electrode of Battery

The binder for a battery according to the present invention may be dissolved into a solvent or may be dispersed into a dispersion medium in a conventional manner to provide a binder composition. particularly, the binder according to the present invention may be dispersed in water as well as an organic solvent or dispersion medium, and thus is environmentally-friendly.

There is no particular limitation in the solvent or the dispersion medium used for the binder composition according to the present invention. However, it is preferable to use a solvent or a dispersion medium present is a liquid state at room temperature under ambient pressure, because such solvents or dispersion media allow the polymer particles to maintain the shape, when electrode slurry comprising the binder composition is applied onto a collector and the dried.

Preferably, the dispersion medium that may be used in the present invention is one capable of dispersing the polymer particles and an electrode active material. Particular examples of the dispersion medium include water; alcohols such as methanol, ethanol, propanol, isopropanol, butanol, isobutanol, s-butanol, t-butanol, pentanol, isopentanol, hexanol, or the like; ketones such as acetone, methyl ethyl ketone, methyl propyl ketone, ethyl propyl ketone, cyclopentanone, cyclohexanone, cycloheptanone, or the like; ethers such as methyl ethyl ether, diethyl ether, dipropyl ether, diisopropyl ether, dibutyl ether, diisobutyl ether, di n-amyl ether, diisoamyl ether, methyl propyl ether, methyl isopropyl ether, methyl butyl ether, ethyl propyl ether, ethyl isobutyl ether, ethyl n-amyl ether, ethyl isoamyl ether, tetrahydrofuran, or the like; lactones such as γ-butyrolactone, δ-butyrolactone, or the like; lactames such as β-lactame, or the like; cycloaliphatic compounds such as cyclopentane, cyclohexane, cycloheptane, or the like; aromatic hydrocarbons such as benzene, toluene, o-xylene, m-xylene, p-xylene, ethyl benzene, propyl benzene, isopropyl benzene, butyl benzene, isobutyl benzene, n-amyl benzene, or the like; aliphatic hydrocarbons such as heptane, octane, nonane, decane, or the like; linear or cyclic amides such as dimethyl formamide, N-methylpyrrolidone, or the like; esters such as methyl lactate, ethyl lactate, propyl lactate, butyl lactate, methyl benzoate, or the like; and other liquid substances that serve as the solvent of the electrolyte as described hereinafter. Among these, it is preferable to use a dispersion medium having a boiling point of 80° C. or higher, preferably of 85° C. or higher in view of a practical process for manufacturing an electrode. Additionally, it is possible to use 2~5 kinds of the aforementioned dispersion media in combination.

Further, other additives, preservatives or stabilizers, as described hereinafter, may be added to the binder composition, if desired.

3. Slurry for Battery Electrode

The present invention provides slurry for an electrode of a lithium secondary battery, which comprises: (a) the binder as defined above; and (b) an electrode active material capable of lithium intercalation/deintercalation. If desired, the slurry may further comprise other additives generally known to one skilled in the art.

The electrode active material is the most important material that determines the capacity of a battery. Any cathode active material generally used in a lithium secondary battery can be used in the present invention, and non-limiting examples of such cathode active materials include metal oxides such as lithiated cobalt oxides, lithiated nickel oxides, lithiated manganese oxides, etc., or composite oxides formed by combination thereof or by combination of a metal oxide with a conductive polymer. Also, any anode active material generally used in a lithium secondary battery can be used in the present invention, and non-limiting examples of such anode active materials include carbonaceous materials such as natural graphite, artificial graphite, MPCF, MCMB, PIC, plasticized phenol resins, PAN-based carbon fibers, petroleum coke, activated carbon, graphite, etc., conductive polymers such as polyacene, lithium-based metals such as lithium metal or lithium alloy, or the like.

If desired, the electrode slurry may further comprise a conductive agent, a viscosity modifier, a supplementary binder, or the like, in addition to the aforementioned active material.

Particular examples of the viscosity modifier that may be used in the present invention include water soluble polymers such as carboxymethyl cellulose, carboxyethyl cellulose, ethyl cellulose, hydroxymethyl cellulose, hydroxypropyl cellulose, carboxyethylmethyl cellulose, polyethylene oxide, ethylene glycol, or the like, but are not limited thereto.

4. Electrode for Battery

The present invention also provides an electrode for a lithium secondary battery, which comprises the slurry comprising the binder according to the present invention and an electrode active material, and a collector, the slurry being applied onto the current collector.

The electrode may be manufactured by a method generally known to one skilled in the art. In one embodiment of the method, electrode slurry comprising a mixture of the binder composition with an active material is applied onto a current collector, and the dispersion medium is removed by drying or by other means, so that the active material particles are bonded to the current collector and are bonded among themselves.

Any collector may be used with no particular limitation, as long as it is formed of a conductive material. Non-limiting examples of the cathode current collector include foil formed of aluminum, nickel or a combination thereof. Non-limiting examples of the anode current collector include foil formed of copper, gold, nickel, copper alloys or a combination thereof.

5. Lithium Secondary Battery

The lithium secondary battery according to the present invention comprises a cathode and an anode, either or both of which are the same electrode as described above, and further comprises a separator interposed between both electrodes, and an electrolyte.

The electrolyte that may be used in the present invention includes a salt represented by the formula of $A^+B^-$, wherein $A^+$ represents an alkali metal cation selected from the group consisting of $Li^+$, $Na^+$, $K^+$ and combinations thereof, and $B^-$ represents an anion selected from the group consisting of $PF_6^-$, $BF_4^-$, $Cl^-$, $Br^-$, $I^-$, $ClO_4^-$, $AsF_6^-$, $CH_3CO_3^-$, $N(CF_3SO_2)_2^-$, $C(CF_2SO_2)_3^-$ and combinations thereof, the salt being dissolved or dissociated in an organic solvent selected from the group consisting of propylene carbonate (PC), ethylene carbonate (EC), diethyl carbonate (DEC), dimethyl carbonate (DMC), dipropyl carbonate (DPC), ethyl methyl carbonate (EMC), dimethyl sulfoxide, acetonitrile, dimethoxyethane, diethoxyethane, tetrahydrofuran, N-methyl-2-pyrrolidone (NMP), gamma-butyrolactone (γ-butyrolactone; GBL) and mixtures thereof.

As the separator, a porous separator having pores may be used and particular examples thereof include a polypropylene-based, a polyethylene-based or a polyolefin-based porous separator.

Although there is no particular limitation in the outer shape of the lithium secondary battery according to the present invention, the battery may be a cylindrical, prismatic, pouch type or a coin type battery.

6. Method for Evaluating Interrelation Between Physical Properties of Binder and Quality of Lithium Secondary Battery Comprising the Same Binder According to the present invention, it has been demonstrated that there is a unique interrelation between physical properties of a binder (e.g., wettability and adhesion of a binder) and the quality of a battery comprising the binder. In fact, according to the following Experimental Example, it can be seen that the binder comprising polymer particles obtained by copolymerization of the monomer composition as described above show not only a low contact angle of 40° or less to an electrolyte but also an excellent adhesion of 50 g/cm or more, and thus provide a lithium secondary battery with improved rate characteristics corresponding to a level of 98% or more and lifespan characteristics corresponding to a level of 85% or more (see the following Table 4).

Such evaluation may be accomplished by measuring the wettability of a binder to an electrolyte and adhesion of a binder, after binders are obtained by polymerization of various copolymerizable monomer compositions according to the present invention, and then by determining characteristics of a lithium secondary battery using the binder, including rate characteristics and lifespan characteristics of the battery. One embodiment of the method for evaluating an interrelation between the wettability of a binder and rate characteristics of a battery comprises the steps of: (a) measuring a contact angle (θ) between the binder according to the present invention and an electrolyte to be used in a battery; (b) providing a battery having an electrode formed by using electrode slurry that comprises the binder of step (a) and an electrode active material; and (c) calculating a percent ratio of capacity ($C_Y$) of the battery of step (b), measured by a constant-current method (YC), to capacity ($C_X$) of the battery of step (b), measured by a constant-current method (XC), to determine rate characteristics (YC/XC, R) of the battery, wherein each of X and Y represents a decimal or an integer ranging from 0.001 to 100, with the proviso that X is greater than Y.

First, measurement for the contact angle between the binder and an electrolyte may be carried out by using a conventional method known to one skilled in the art, for example, by using a sessile drop method, a wilhelmy plate method, a captive drop method, or a tilting method. In one embodiment of such methods, a binder composition, obtained by dissolving the binder into a solvent, is applied onto a surface-treated substrate and dried, and then an electrolyte to be used is allowed to be in contact with, to infiltrate into, or to drop onto the substrate, followed by measuring the contact angle with a contact angle measuring device. Measurement of the contact angle is generally performed at room temperature (25° C.).

Although the binder coated onto the substrate preferably has a thickness of 10~20 (±0.1) μm, the thickness is not limited thereto and may be varied if desired. Additionally, the electrolyte used in the measurement of the contact angle is the same as the electrolyte used for the battery. Herein, it is preferable to measure the contact angle while maintaining the same condition to increase the reproducibility, because the contact angle may be varied as a function of the temperature, time, volume, drop size, surface roughness, or the like.

According to the above evaluation method, when the contact angle (θ) between the binder and the electrolyte is 40° or less, it can be seen that rate characteristics (R) of a battery using the same binder correspond to a level of 98% or more.

Additionally, in order to determine lifespan characteristics instead of rate characteristics, one embodiment of methods for evaluating an interrelation between the adhesion of a binder and lifespan characteristics of a battery comprises the steps of: (a) providing an electrode comprising the binder according to the present invention and an electrode active material, and measuring adhesion of the binder in the electrode; and (b) providing a battery having the electrode of step (a), and calculating a percent ratio of capacity ($C_A$) of the battery after a lapse of the $A^{th}$ cycle to initial capacity ($C_1$) of the battery, measured by a constant-current method (XC), to determine lifespan characteristics (L) of the battery, wherein A is an integer between 2 and 500.

There is no particular limitation in the method for measuring the adhesion of the binder and any conventional method may be used. In fact, when the binder has an adhesion of 50 g/cm or more, it can be seen that lifespan characteristics (L) of a battery correspond to a level of 85% or more (see Table 4).

BEST MODE FOR CARRYING OUT THE INVENTION

Reference will now be made in detail to the preferred embodiments of the present invention. It is to be understood that the following examples are illustrative only and the present invention is not limited thereto.

EXAMPLE 1

1-1. Binder Composition

First, 167.4 g of ion exchange water were introduced into a reactor and the reactor was heated to 75° C. When ion exchange water reached 75° C., 10.4 g of butyl acrylate, 7.7 g of styrene and 0.18 g of sodium lauryl sulfate were introduced into the reactor. Next, 0.14 g of potassium persulfate was dissolved into 9.0 g of ion exchange water and the solution was introduced into the reactor while maintaining the internal temperature of the reactor at 75° C. to provide seed (1).

To seed (1), a reaction mixture obtained by mixing and emulsifying 167.4 g of ion exchange water, 54.0 g of styrene, 108.2 g of butyl acrylate, 1.4 g of aryl methacrylate, 9.7 g of itaconic acid and 0.27 g of sodium lauryl sulfate was introduced in portions over 3 hours, while 0.38 g of potassium persulfate dissolved in 18.0 g of ion exchange water was also introduced in portions over 3 hours to provide a binder polymer.

A binder composition for an anode was obtained by adding potassium hydroxide to the binder polymer to adjust the pH to 7. Meanwhile, a binder composition for a cathode was obtained by adding 500 g of NMP to 50 g of the binder polymer and removing water from the composition by way of distillation at 90° C.

1-2. Slurry for Battery Electrode

Anode slurry was prepared as follows: 94 g of graphite as an active material (available from Osaka Gas Co., MCMB 10-28), 1.0 g of conductive carbon (Super-P), 2.5 g of the binder composition according to Example 1 and 2.5 g of carboxymethyl cellulose as a water soluble polymer were mixed in water as a dispersion medium, and then the slurry was adjusted to a total solid content of 45%.

Cathode slurry was prepared as follows: 94 g of $LiCoO_2$ having an average particle diameter of 10 μm (active material), 11.0 g of conductive carbon (Super-P) and 5.0 g of the binder composition according to Example 1 were mixed in NMP as a dispersion medium, and then the slurry was adjusted to a total solid content of 45%.

1-3. Electrode for Battery

The anode slurry and the cathode slurry obtained from Example 1-2 were applied onto copper foil and aluminum foil, respectively, to a thickness of 200 μm, dried at 90° C. for 10 minutes and at 120° C. for 10 minutes under normal pressure, and then further dried at 120° C. for 2 hours under vacuum. The dried electrode was pressed to a porosity of 30% to provide a cathode and an anode.

1-4. Lithium Ion Secondary Battery

A coin type battery was manufactured by using the cathode and the anode obtained from Example 1-3, and a separator made of a polyolefin microporous membrane and interposed between both electrodes. Then, an electrolyte containing 1M $LiPF_6$ electrolyte, dissolved in a mixed solvent including EC and EMC in a volume ratio of EC:EMC=1:1, was introduced into the battery to finish a lithium ion secondary battery.

EXAMPLES 2~8

Seed (1) obtained from Example 1 was used and the monomers for emulsion polymerization, which had various compositions as described in the following Table 1, were introduced thereto to provide a binder polymer, slurry for an electrode, an electrode for a battery and a lithium secondary battery, in the same manner as described in Examples 1-1 to 1-4.

TABLE 1

| Compound (g) | Ex. 2 | Ex. 3 | Ex. 4 | Ex. 5 | Ex. 6 | Ex. 7 | Ex. 8 |
|---|---|---|---|---|---|---|---|
| Ethyl acrylate | | | | 9.2 | | 5.6 | |
| n-Butyl acrylate | 108.2 | 99.4 | | 126.0 | 108.2 | 79.9 | 104.4 |
| 2-ethylhexyl acrylate | | | 103.5 | | | 26.1 | |
| Methyl methacrylate | | 62.8 | | | | 7.7 | |
| Aryl methacrylate | 1.4 | 1.4 | 1.4 | 1.4 | 1.4 | 1.4 | 1.4 |
| Styrene | | | 58.7 | 27.0 | 54.0 | 35.2 | 46.8 |
| Acrylonitrile | 54.0 | | | | | 7.7 | |
| Itaconic acid | 9.7 | 9.7 | 9.7 | 9.7 | | 4.8 | 20.7 |
| Acrylic acid | | | | | 9.7 | 4.9 | |

Comparative Examples 1~5

Seed (1) obtained from Example 1 was used and the monomers for emulsion polymerization, which had various compositions as described in the following Table 2, were introduced thereto to provide a binder polymer, slurry for an electrode, an electrode for a battery and a lithium secondary battery, in the same manner as described in Examples 1-1 to 1-4.

TABLE 2

| Compound (g) | Comp. Ex. 1 | Comp. Ex. 2 | Comp. Ex. 3 | Comp. Ex. 4 | Comp. Ex. 5 |
|---|---|---|---|---|---|
| 1,3-Butadiene | 85.3 | 39.3 | 85.3 | 85.3 | 85.3 |
| n-Butyl acrylate | | 39.3 | | | |
| Methyl methacrylate | | | 76.9 | | 25.6 |
| Aryl methacrylate | 1.4 | 1.4 | 1.4 | 1.4 | 1.4 |

TABLE 2-continued

| Compound (g) | Comp. Ex. 1 | Comp. Ex. 2 | Comp. Ex. 3 | Comp. Ex. 4 | Comp. Ex. 5 |
|---|---|---|---|---|---|
| Styrene | 76.9 | 83.6 | | | 25.7 |
| Acrylonitrile | | | | 76.9 | 25.6 |
| Itaconic acid | 9.7 | 9.7 | 9.7 | 9.7 | 4.9 |
| Acrylic acid | | | | | 4.8 |

EXAMPLES 9~16

The seed (1) obtained from Example 1 was used and the monomers for emulsion polymerization, which had various compositions as described in the following Table 3, were introduced thereto to provide a binder polymer, slurry for an electrode, an electrode for a battery and a lithium secondary battery, in the same manner as described in Examples 1-1 to 1-4.

Herein, Examples 9~11 provided binder polymers having a different glass transition temperature, Examples 12~14 provided binder polymers having a different gel content, and Examples 15 and 16 provided binder polymers having a different particle size. The seed used in Examples 15 and 16 were prepared by using 0.3 g and 0.06 g of sodium lauryl sulfate, respectively.

TABLE 3

| | n-Butyl acrylate (g) | Aryl methacrylate (g) | Styrene (g) | Itaconic acid (g) |
|---|---|---|---|---|
| Ex. 9 | 135.0 | 1.4 | 27.2 | 9.7 |
| Ex. 10 | 81.2 | 1.4 | 81.0 | 9.7 |
| Ex. 11 | 54.2 | 1.4 | 108.0 | 9.7 |
| Ex. 12 | 110.2 | 4.2 | 52.0 | 9.7 |
| Ex. 13 | 107.2 | 0.2 | 55.0 | 9.7 |
| Ex. 14 | 105.2 | 0.0 | 57.0 | 9.7 |
| Ex. 15 | 108.2 | 1.4 | 54.0 | 9.7 |
| Ex. 16 | 108.2 | 1.4 | 54.0 | 9.7 |

EXAMPLE 17

First, 167.4 g of ion exchange water were introduced into a reactor and the reactor was heated to 75° C. When ion exchange water reached 75° C., 8.1 g of 1,3-butadiene, 10.1 g of styrene and 0.23 g of sodium lauryl sulfate were introduced into the reactor. Next, 0.14 g of potassium persulfate was dissolved into 9.0 g of ion exchange water and the solution was introduced into the reactor while maintaining the internal temperature of the reactor at 75° C. to provide seed (2). Then, the remaining steps for providing a binder polymer were carried out in the same manner as described in Example 1-1 to evaluate variations in the physical properties of binders depending on the kind of the seed. Additionally, Examples 1-2 to 1-4 were repeated to provide slurry for an electrode, an electrode for a battery and a lithium secondary battery.

EXPERIMENTAL EXAMPLE 1

Measurement of Specific Physical Properties of Binder

The following experiment was performed to determine specific physical properties of the binder according to the present invention.

As the binder, each of the binder compositions according to Examples 1~17 was used, and each of the binder compositions according to Comparative Examples 1~5 was used as a control.

Specific physical properties of a binder included the particle diameter, the glass transition temperature and the gel content of the binder. The particle diameter was measured by using a light scattering device, the glass transition temperature was measured by using DSC (Differential Scanning Calorimeter) with a heating rate of 10° C./min., and the gel content was measured using toluene as a solvent. The experimental results are shown in the following Table 4.

EXPERIMENTAL EXAMPLE 2

Evaluation of Contact Angle Between Binder and Electrolyte

The following experiment was measured to evaluate the contact angle between the binder according to the present invention and an electrolyte.

Each of the binder compositions according to Examples 1~17 was used as a sample, and each of the binder compositions according to Comparative Examples 1~5 was used as a control. Each binder composition was applied onto a surface-treated glass substrate to a film thickness of 10±10.1 μm and dried. Then, the contact angle between the binder and an electrolyte, which contains 1M $LiPF_6$ electrolyte dissolved in a mixed solvent including EC and EMC in a volume ratio of EC:EMC=1:1, was measured by using a contact angle measuring device.

As used herein, "contact angle" is defined as the contact angle measured 0.1 second after dropping the electrolyte onto the binder. This is because a contact angle is varied when the electrolyte infiltrates into the binder composition or evaporates to the air. The experimental results are shown in the following Table 4.

EXPERIMENTAL EXAMPLE 3

Evaluation of Quality of Battery

The following experiment was performed to evaluate the quality of a lithium secondary battery using the binder composition according to the present invention.

Each of the lithium secondary batteries according to Examples 1~17 and Comparative Examples 1~5 was used.

Quality of a battery, determined in this Example, included rate characteristics and lifespan characteristics. Rate characteristics were evaluated by calculating a percent ratio of the capacity, measured by a 0.5 C constant-current method and by a 1.0 C constant-current method, to the capacity measured by a 0.2 C constant-current method. Lifespan characteristics were evaluated by calculating a percent ratio of the capacity, measured by a 0.2 C constant-current method after repeating 30 charge/discharge cycles, to the initial capacity. Five coin type batteries were manufactured by using the same binder composition, the same experiment was performed for the five batteries, and then the measured values were averaged for the final evaluation. The experimental results are shown in the following Table 4.

EXPERIMENTAL EXAMPLE 4

Evaluation of Adhesion

The following experiment was performed to evaluate the adhesion of an electrode active material to a collector in the electrode obtained by using the binder composition according to the present invention.

Each of the electrodes according to Examples 1~17 was used as a sample, and each of the electrodes according to Comparative Examples 1~5 was used as a control.

After each electrode, cut into a size of 1 cm, was attached onto a glass substrate, 180° peel strength was measured while the collector is removed. Such measurement was repeated at least five times and the measured values were averaged for the final evaluation. The experimental results are shown in the following Table 4.

TABLE 4

| | | | | | Battery quality (%) | | | |
|---|---|---|---|---|---|---|---|---|
| | | | | | Rate characteristics | | | |
| Sample | Particle diameter (nm) | Glass transition temperature (° C.) | Gel content (%) | Contact angle (°) | 0.5 C/ 0.2 C | 1.0 C/ 0.2 C | Lifespan characteristics | Adhesion (g/cm) |
| Ex. 1 | 195 | −5 | 85 | 35.7 | 98.9 | 97.5 | 89.2 | 55.3 |
| Ex. 2 | 197 | −1 | 85 | 32.5 | 99.2 | 98.0 | 90.1 | 50.1 |
| Ex. 3 | 193 | −8 | 83 | 35.5 | 98.9 | 97.6 | 89.4 | 51.5 |
| Ex. 4 | 194 | −5 | 85 | 36.5 | 98.8 | 97.4 | 89.0 | 51.3 |
| Ex. 5 | 190 | −2 | 86 | 35.6 | 98.9 | 97.5 | 89.1 | 53.2 |
| Ex. 6 | 194 | −7 | 85 | 36.3 | 98.8 | 97.4 | 89.0 | 52.8 |
| Ex. 7 | 196 | −3 | 85 | 36.1 | 98.8 | 97.4 | 89.0 | 52.6 |
| Ex. 8 | 198 | −2 | 84 | 32.8 | 99.2 | 97.9 | 90.0 | 60.6 |
| Comp. Ex. 1 | 199 | −3 | 88 | 43.7 | 97.2 | 95.9 | 75.3 | 35.1 |
| Comp. Ex. 2 | 195 | −4 | 85 | 40.3 | 97.9 | 96.0 | 79.8 | 39.5 |
| Comp. Ex. 3 | 195 | −5 | 86 | 45.8 | 97.0 | 95.3 | 73.1 | 30.8 |
| Comp. Ex. 4 | 197 | −1 | 85 | 40.8 | 98.1 | 96.0 | 80.7 | 40.9 |
| Comp. Ex. 5 | 197 | −4 | 86 | 40.1 | 98.1 | 96.5 | 81.7 | 38.0 |
| Ex. 9 | 195 | −25 | 88 | 36.4 | 98.8 | 97.4 | 89.0 | 52.0 |
| Ex. 10 | 193 | 18 | 83 | 36.0 | 98.8 | 97.4 | 89.1 | 53.2 |
| Ex. 11 | 191 | 40 | 79 | 36.9 | 98.7 | 97.3 | 89.0 | 50.3 |
| Ex. 12 | 190 | −3 | 97 | 35.2 | 99.0 | 97.6 | 89.4 | 57.2 |
| Ex. 13 | 195 | −5 | 54 | 35.9 | 98.9 | 97.5 | 89.1 | 54.1 |
| Ex. 14 | 198 | −3 | 35 | 36.3 | 98.8 | 97.4 | 89.0 | 51.5 |
| Ex. 15 | 110 | −4 | 86 | 35.9 | 98.8 | 97.4 | 89.1 | 53.5 |
| Ex. 16 | 285 | −5 | 85 | 36.0 | 98.8 | 97.4 | 89.1 | 52.4 |
| Ex. 17 | 201 | −3 | 87 | 35.8 | 98.9 | 97.5 | 89.2 | 55.1 |

As can be seen from the above results described in Table 4, the present invention has the following characteristics:

(1) After evaluating the contact angle between the binder and an electrolyte, the binder composition according to the present invention shows a contact angle of 40° or less, and thus has excellent wettability to an electrolyte (see Table 4). Particularly, the binder obtained by polymerization of acrylonitrile, which is a vinyl monomer, shows the most excellent wettability. This results from the fact that the triple bond contained in the acrylonitrile monomer improves electrical properties.

(2) Additionally, after evaluating the adhesion of an active material to a collector in an electrode, the electrode obtained by using the binder composition according to the present invention shows a significant increase in the adhesion of the active material to the collector, as compared to the electrodes according to Comparative Examples (see Table 4). Therefore, it can be seen that the binder composition according to the present invention can improve the structural stability of an electrode and the quality of a battery.

(3) Further, after evaluating the quality of a lithium secondary battery, the lithium secondary battery obtained by using the binder composition according to the present invention shows significantly improved rate characteristics and lifespan characteristics, as compared to the batteries according to Comparative Examples 1~5 (see Table 4). Particularly, although the batteries according to Comparative Examples 1~4 show a low contact angle of 40° or less so that the rate characteristics can be improved, the batteries have poor adhesion, and thus show degradation in the lifespan characteristics.

INDUSTRIAL APPLICABILITY

As can be seen from the foregoing, the binder according to the present invention has a low contact angle to an electrolyte, thereby providing excellent wettability to an electrolyte, and shows excellent adhesion. Therefore, the binder according to the present invention can improve the quality of a battery, including rate characteristics and lifespan characteristics of a battery.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. A binder of polymer particles obtained by polymerizing a composition in the presence of a solvent and optionally a surfactant, the composition consisting of:

(a) 1-80 parts by weight of an acrylic or methacrylic acid ester monomer;

(b) 1-20 parts by weight of an unsaturated carboxylic acid monomer;

(c) 0.001-40 parts by weight of at least one vinyl monomer selected from the group consisting of styrene, α-methylstyrene, β-methylstyrene, and p-t-butylstyrene, (d) 0-70 parts by weight of a conjugated diene monomer as a polymerizable monomer, and (e) at least one additive selected from the group consisting of a molecular weight modifier, a crosslinking agent and a polymerization initiator, based on 100 parts by weight of the binder polymer, and which allows electrode active material particles capable of lithium intercalation/deintercalation to be fixed and linked among themselves, and between the particles and a current collector.

2. The binder according to claim 1, which has a solubility parameter of 18~30 $MPa^{1/2}$.

3. The binder according to claim 1, which shows a contact angle (θ) of 40° or less to an electrolyte to be used, as measured at 25° C.

4. The binder according to claim 1, which shows an adhesion of 50 g/cm or more between an electrode active material and a current collector in an electrode.

5. The binder according to claim 1, wherein the acrylic or (meth)acrylic acid ester monomer is at least one monomer selected from the group consisting of methyl acrylate, ethyl acrylate, propyl acrylate, isopropyl acrylate, n-butyl acrylate, isobutyl acrylate, n-amyl acrylate, isoamyl acrylate, n-hexyl acrylate, 2-ethylhexyl acrylate, hydroxyethyl acrylate, hydroxypropyl acrylate, lauryl acrylate, methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, hydroxyethyl methacrylate, hydroxypropyl methacrylate, lauryl methacrylate, and allyl methacrylate.

6. The binder according to claim 1, wherein the unsaturated carboxylic acid monomer is at least one monomer selected from the group consisting of acrylic acid, methacrylic acid, itaconic acid, fumaric acid, citraconic acid, metaconic acid, glutaconic acid, crotonic acid, and isocrotonic acid.

7. The binder according to claim 1, wherein the conjugated diene monomer is at least one monomer selected from the group consisting of 1,3-butadiene, 1,3-pentadiene and isoprene.

8. The binder according to claim 1, wherein the polymer particles have a final particle diameter of 100~300 nm, a glass transition temperature (Tg) of −30~50° C., and a gel content of 30~99%.

9. An electrode comprising:

(a) a binder as defined in claim 1; and (b) an electrode active material capable of lithium intercalation/deintercalation.

10. A lithium secondary battery comprising a cathode, an anode, a separator and an electrolyte, wherein either or both of the cathode and the anode are the electrode as defined in claim 9.

11. The lithium secondary battery according to claim 10, which shows improved rate characteristics through activation of electrochemical reactions including conduction and transfer of lithium ions due to improved wettability of a binder in the electrode to the electrolyte.

* * * * *